United States Patent [19]
Nakatani

[11] Patent Number: 5,387,974
[45] Date of Patent: Feb. 7, 1995

[54] LASER APPARATUS INCLUDING FABRY-PEROT WAVELENGTH DETECTOR WITH TEMPERATURE AND WAVELENGTH COMPENSATION

[75] Inventor: Hajime Nakatani, Amagasaki, Japan

[73] Assignee: Mitsubishi Denki Kabushiki Kaisha, Tokyo, Japan

[21] Appl. No.: 57,831

[22] Filed: May 7, 1993

[30] Foreign Application Priority Data

May 15, 1992 [JP] Japan ................ 4-123435

[51] Int. Cl.[6] .......................... G01B 9/02
[52] U.S. Cl. ...................... 356/352; 372/32
[58] Field of Search ......... 356/346, 352; 372/29, 372/32

[56] References Cited

U.S. PATENT DOCUMENTS 4,914,662 4/1990 Nakatani et al. .
4,986,665 1/1991 Yamanish et al. ............. 356/402

FOREIGN PATENT DOCUMENTS 0428744 5/1991 European Pat. Off. .
64-84681 3/1989 Japan .
2210496 6/1989 United Kingdom .

OTHER PUBLICATIONS

Laser Und Optoelektronik, vol. 15, No. 3, Sep. 1983, pp. 245-251, G. Meisel, "Die Stabilisierung Und Durchstimmung Von Dauerstrich-Farbstofflasern, Teil II" (with English Translation).

Applied Optics, vol. 21, No. 21, Nov. 1, 1982, pp. 3896-3902, D. Rees, et al., "Stable and Rugged Etalon for the Dynamics Explorer Fabry-Perot Interferometer. 1: Design and Construction".

IEEE Journal of Quantum Electronics, vol. 14, No. 1, Jan. 1978, pp. 17-22, J. Munch, et al., "Frequency Stability and Stabilization of a Chemical Laser".

K. Dasgupta, et al., Applied Optics, vol. 26, No. 17, Sep. 1, 1987, pp. 3659-3662. "Wavelength stabilization and control of pulsed cw tunable dye lasers: a simple scheme".

Primary Examiner—Samuel A. Turner
Attorney, Agent, or Firm—Oblon, Spivak, McClelland, Maier, & Neustadt

[57] ABSTRACT

An inexpensive, high-accuracy and highly stable wavelength measuring device and laser device without requiring any complicated and expensive temperature regulating means, wherein an error in the measured wavelength of a to-be-measured light obtained from a photosensor by detecting temperature of a Fabry-Perot etalon with a temperature sensor and operating the error in wavelength from the detected data, caused by thermal expansion of a spacer.

6 Claims, 4 Drawing Sheets

DISTANCE X

LASER APPARATUS INCLUDING FABRY-PEROT WAVELENGTH DETECTOR WITH TEMPERATURE AND WAVELENGTH COMPENSATION

BACKGROUND OF THE INVENTION

1. Field of the Invention

This invention relates to a wavelength measuring device and a laser apparatus equipped with the wavelength measuring device for generating a laser of constant wavelength.

2. Description of the Related Art

FIG. 1 illustrates a conventional laser apparatus, for example, disclosed in the Japanese Patent Application Laid-Open No. 1-84681 (1989). In the drawing, references 1, 5 and 6 respectively denote a laser oscillator, a full reflection mirror and a partial reflection mirror disposed confronting the full reflection mirror 5 via the laser oscillator 1. A Fabry-Perot etalon (referred to as FP hereinafter) denoted by a reference number 7 is located between the laser oscillator 1 and the partial reflection mirror 6. The FP 7 is housed in a sealed container 8 filled with a gas. A volume increasing/decreasing means 9 by bellows is connected to the sealed container 8. The volume increasing/decreasing means 9 is driven by a servo mechanism 10. A laser beam 11 is oscillated by the laser oscillator 1, full reflecting mirror 5, partial reflecting mirror 6 and FP 7. A mirror 12 picks out a part of the laser beam 11, a sampling beam 13 to be measured. A wavelength measuring device 2 measures a wavelength of the sampling beam 13.

The wavelength measuring device 2 consists of an interference filter 14 allowing only the sampling beam 13 to pass through, a light intensity adjusting filter 15, an integrator 16 for dispersing the sampling beam 13, an air spaced FP 17 with a gap used as a monitor, a sealed container 18 in which the FP 17 is sealed, an image formation lens 19, a photosensor 20 of a one-dimensional image sensor to observe a fringe generated by the FP 17, an optical shielding box 21 for shutting off the outside light, a temperature regulator 22 for maintaining the FP 17 at a constant temperature, and a data processor 23 for analyzing the fringes observed by the photosensor 20. The output of the data processor 23 is inputted to the servo mechanism 10.

The operation will be depicted hereinafter. A wavelength of the laser beam 11 emitted from the laser oscillator 1 is selected by various kinds of elements in the oscillator 1. For example, the intrinsic width of an oscillating wavelength of an excimer laser is several angstroms, but the width is reduced when spectral elements such as a prism, a grating, an FP or the like are installed in the oscillator. Moreover, if the spectral elements are properly adjusted, an optional wavelength can be set within the width of the intrinsic oscillating wavelength. However, the selected wavelength is hard to be stabilized with high accuracy due to thermal deformation or vibration of the oscillator. As such, a wavelength of the laser is measured by introducing the sampling beam 13, a part of the laser beam 11, into the wavelength measuring device 2, and driving the servo mechanism 10 based on the measuring result to change the pressure of the ambience gas in the FP 7, thus stabilizing the wavelength of the laser.

The wavelength measuring device 2 uses the FP 17 for determining the wavelength. The FP 17 called as an air spaced Fabry-Perot etalon is obtained by bonding two highly flat mirrors 17a, 17b sandwiching a spacer 17c of thickness d. The center wavelength of the light passing through the mirrors 17a, 17b at an angle $\theta$ is represented by an equation (1) below:

$$\lambda = 2nd \times \cos\theta_m / m \quad (1)$$

wherein n is a refractive index of the gap, m is an integer indicating the degree and $\theta_m$ is an angle of the degree m.

When the laser beam has a divergence angle after passing through the integrator, only the beam component satisfying the above equation (1) among the beams entered the FP 17 penetrates the FP 17, forming a coaxial fringe (a ring-shaped interference fringe) centering the optical axis of the laser beam at the focal point of the image formation lens 19. As the photosensor 20 is arranged at the point focal of the image formation lens 19, the waveform having the light intensity distribution as shown in FIG. 2 is obtained. The abscissa in FIG. 2 indicates a distance x from the center of the fringe. The peak position $x_m$ of the fringe corresponding to the degree m is represented by the following equation (2):

$$x_m = f \times \theta_m \quad (2)$$

Therefore, when the laser wavelength $\lambda$ changes, the intensity distribution changes from that indicated by a solid line to that by a broken line in FIG. 2. The change of the laser beam in wavelength can be operated from the change of the peak positions $x_m$'s according to the equations (1) and (2).

As is understood from the equation (1), even when the wavelength $\lambda$ does not change, $\theta_m$ changes by a change in n or d, and accordingly the peak position $x_m$ of the fringes changes. In the conventional example, the FP 17 is sealed in the sealed container 18 and the density of the gas in the container 18 is kept constant so as to maintain the refractive index of the gap constant. Moreover, the temperature regulator keeps the temperature of the FP 17 constant so as to prevent the spacer 17c constituting the FP 17 from changing in thickness d of the spacer 17c as a result of thermal expansion.

When applying a KrF excimer laser as a light source of a lens reduction projection aligner in a semiconductor manufacturing apparatus, it is necessary to restrict the change of the laser wavelength not to exceed 0.5pm. Therefore, the allowable change $\Delta\lambda$ in wavelength to satisfy the measuring accuracy required for the wavelength measuring device 2 is approximately 0.05pm. The spacer 17c of the FP 17 of the excimer laser is generally made of quartz glass having a thermal expansion coefficient a of $5 \times 10^{-7}$. The change $\Delta\lambda$ in wavelength when the temperature of the spacer 17 changes by $\Delta T$ is expressed by an equation (3):

$$\Delta\lambda = \lambda \times \Delta d/d = \lambda \times a \times \Delta T \quad (3)$$

Accordingly, the temperature change of the spacer 17c should not exceed 0.4° C. so as to restrict the change in wavelength not to exceed 0.05pm. In consequence, the temperature regulator 22 should restrict the temperature change of the FP 17 not to exceed 0.4° C.

Since the conventional wavelength measuring device and the wavelength stabilizing laser apparatus equipped with the wavelength measuring device are constructed to always necessitate the use of temperature regulator 22 in order to execute considerably minute control of the temperature, the conventional device and apparatus are disadvantageously complicated and expensive.

SUMMARY OF THE INVENTION

This invention has been devised to solve the aforementioned disadvantages, and has for its object to provide a wavelength measuring device capable of measuring wavelength with sufficiently high accuracy without using a temperature regulating means, and a wavelength stabilizing laser apparatus equipped with the wavelength measuring device.

The above and further objects and features of the invention will more fully be apparent from the following detailed description with accompanying drawings.

DESCRIPTION OF THE PREFERRED EMBODIMENTS Embodiment 1

Figure 3:
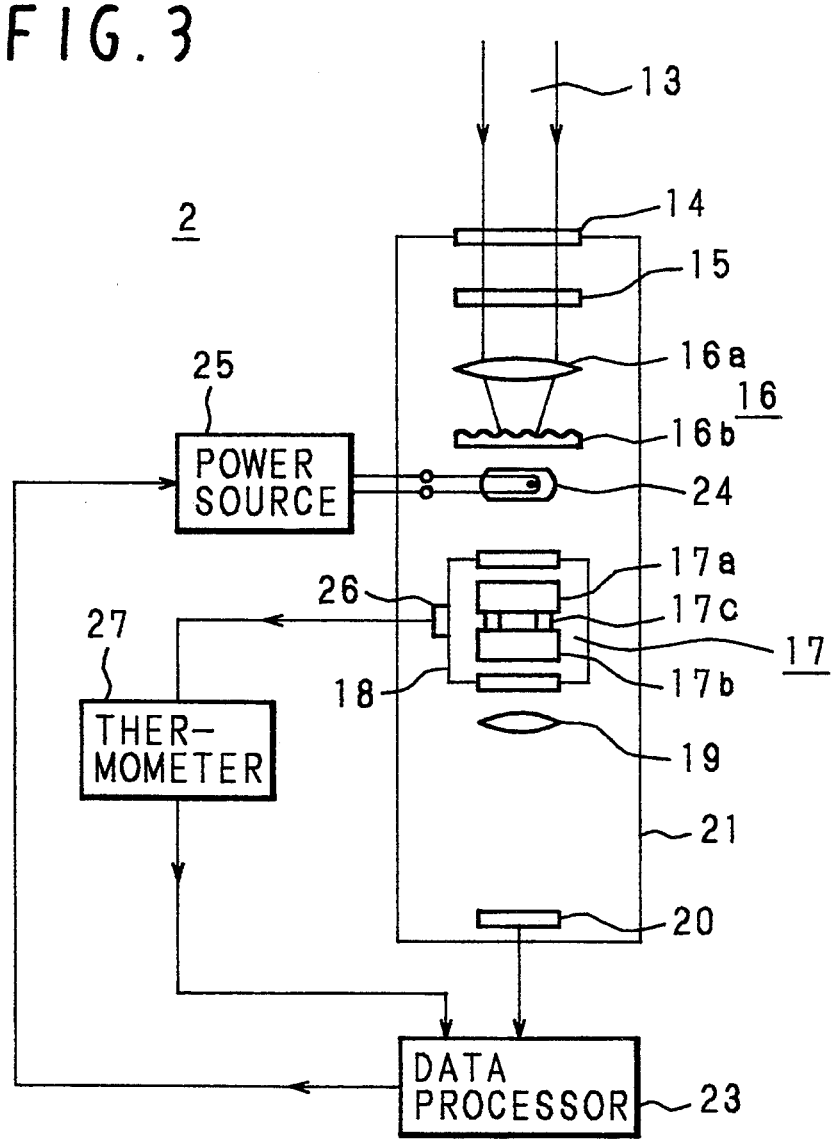
FIG. 3 is a structural diagram of a wavelength measuring device according to Embodiment 1 of this invention.

FIG. 3 shows the structure of a wavelength measuring device 2 according to Embodiment 1 of this invention when applying a KrF excimer laser. The same parts as those of the prior art are designated by the same reference numerals, and the description thereof will be abbreviated here. Referring to FIG. 3, a convex lens 16a and a scattering plate 16b constitute an integrator 16. After passing through the convex lens 16a and the scattering plate 16b, the beam having a divergence angle enters the FP 17.

A standard light source 24 is placed between the scattering plate 16b and the FP 17. In the embodiment, the standard light source 24 is a mercury lamp. A power source 25 for the standard light source 24 is turned ON/OFF by the data processor 23. To a temperature sensor 26 for measuring the temperature of the FP 17 is connected a temperature measuring device 27. The measured data by the temperature measuring device 27 is fed to the data processor 23.

Although a conventional temperature regulator is not employed in the embodiment, the measuring error caused by thermal expansion of the FP which changes a gap distance d can be predicted according to the equation (3) described earlier because the temperature of the FP 17 is measured. Accordingly, the correct wavelength is obtained by removing the measuring error predicted in accordance with the equation (3) from the actually measured wavelength which is calculated from the peak position of the fringe on the photosensor 20.

If the spacer 17c of the FP 17 is made of glass of such a linear expansion coefficient as $5 \times 10^{-7}$ or lower, the measuring error resulting from the temperature change naturally reduces much more.

Although it is possible to reduce the measuring error by using the special material, there actually exist errors relatively hard to grasp by quantity, such as errors resulting from the change of the FP with time. Therefore, the arrangement in FIG. 3 using the standard light source 24 is devised to also eliminate such errors as above caused by intricate reasons, which enables more accurate measurement of the wavelength. The arrangement will be discussed more in detail below.

Figure 4:
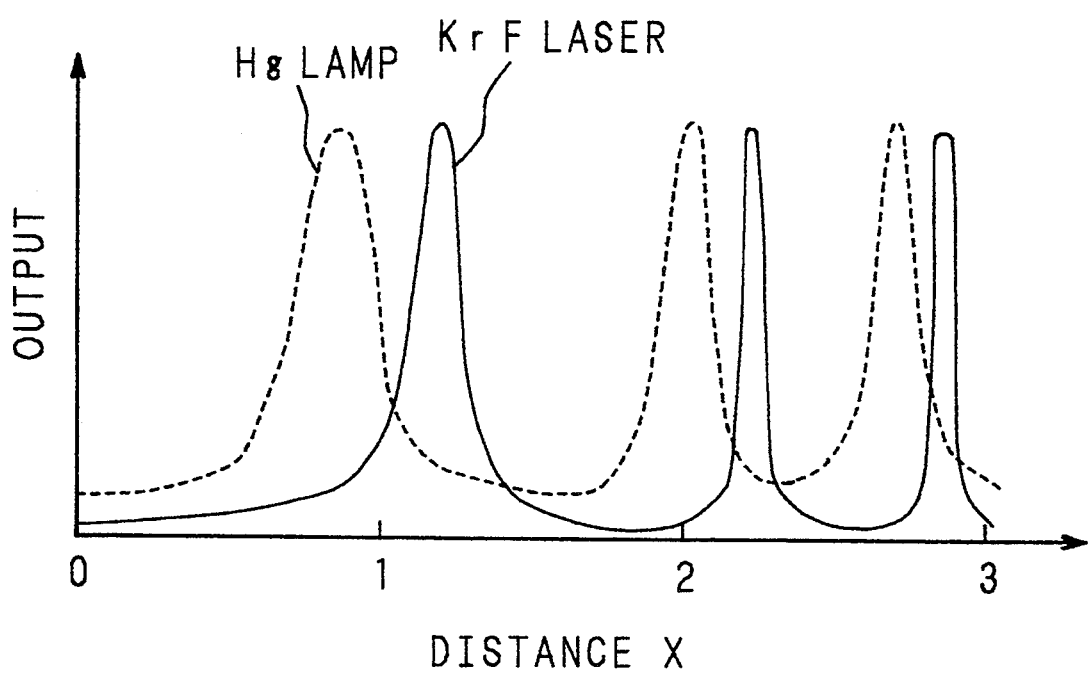
FIG. 4 is a diagram of fringes formed on the photosensor of FIG. 3.

In Embodiment 1, the sampling beam 13 is a KrF excimer laser (wavelength $\lambda = 248.4$ nm) and the standard light source 24 is a mercury lamp (wavelength $\lambda = 252$ nm) close to that of a to-be-measured light. FIG. 4 shows both fringes formed by the mercury lamp and the KrF laser.

When measuring the peak position of the fringe by the mercury lamp for a long time while stopping the oscillation of the laser apparatus, although it is assumed that the peak position of the fringe does not change since the wavelength of the mercury lamp does not change, the peak position of the fringe gradually changes in fact because of the changes with time of the glass material forming the FP 17 (change by the nm order of the gap d), or of the change in the refractive index n due to the leak of the filling gas or the gas emission through the material of the sealed container 18. $\Delta\theta_{HG}$ is taken as an angle converted from the changing amount of the peak position, the equation (1) is differentiated to the following equation (4):

$$\Delta\lambda_{Hg}/\lambda_{Hg} = \Delta n_1/n + \Delta n_2/n + \Delta d_1/d + \Delta d_2/d + \tan\theta_{Hg} \times \Delta\theta_{Hg} \quad (4)$$

wherein $\Delta n_1$ is the changing amount of the refractive index due to the change in the gas density, $\Delta n_2$ is the sum of the changing amounts of the refractive index except for $\Delta n_1$, including, for example, the changing amount resulting from the gas emission via the composing material, $\Delta d_1$ is the changing amount of the gap d due to thermal expansion of the FP and $\Delta d_2$ is the changing amount of the gap d due to the change of the FP with time.

If a solid etalon or an air spaced Fabry-Perot etalon is used for the FP, $\Delta n_1 = 0$ is held by sealing the FP in a sealed container without leaking. Moreover, if the spacer 17c of the air spaced Fabry-Perot etalon is constituted of glass of a low expansion coefficient, or if the temperature of the FP is measured to correct the error, $\Delta d_1 = 0$ is satisfied.

Since the wavelength of the mercury lamp as a standard light source does not change, $\Delta\lambda_{Hg} = 0$ is held. Accordingly, the following equation (5) is obtained:

$$\Delta n_2/n + \Delta d_2/d = -\tan\theta_{Hg} \times \Delta\theta_{Hg} \quad (5)$$

Thus, it becomes possible to predict the drift of the FP over a long term expressed by the terms on the right side of the equation (4) from the measuring value of $\Delta\theta_{Hg}$. In other words, a highly accurate measuring value of the wavelength is ensured when the measuring result is corrected by the amount of the drift.

Subsequently, by oscillating the laser apparatus while stopping the mercury [amp, the angular change $\Delta\theta$ is obtained from the change of the peak position of the fringe, and the changing amount $\Delta\lambda$ in wavelength of the laser beam is represented as follows:

$$\begin{aligned}\Delta\lambda/\lambda &= \Delta n_2/n + \Delta d_2/d + \tan\theta \times \Delta\theta \\ &= -\tan\theta_{Hg} \times \Delta\theta_{Hg} + \tan\theta \times \Delta\theta\end{aligned} \quad (6)$$

Therefore, in order to make the changing amount $\Delta\lambda$ in the wavelength of the laser beam equal to zero, the peak position of the fringe of the early laser beam before the longterm drift of the FP should be shifted by $\Delta\theta$ obtained in accordance with an equation (7) below. That is, the peak position should be corrected following the equation (7):

$$\Delta\theta = \tan\theta_{Hg} \times \Delta_{Hg}/\tan\theta \qquad (7)$$

As depicted above, the wavelength measuring device of the embodiment removes the measuring error of the wavelength due to the temperature change of the FP 17 ($\Delta d_1 = 0$) by measuring the temperature of the FP 17 by means of the temperature sensor 26. At the same time, the device corrects by shifting the peak position of the fringe formed by the laser beam by measuring the change of the peak position of the fringe formed by the standard light source 24. Therefore, the wavelength measuring device can obtain the considerably highly accurate result.

Figure 1:
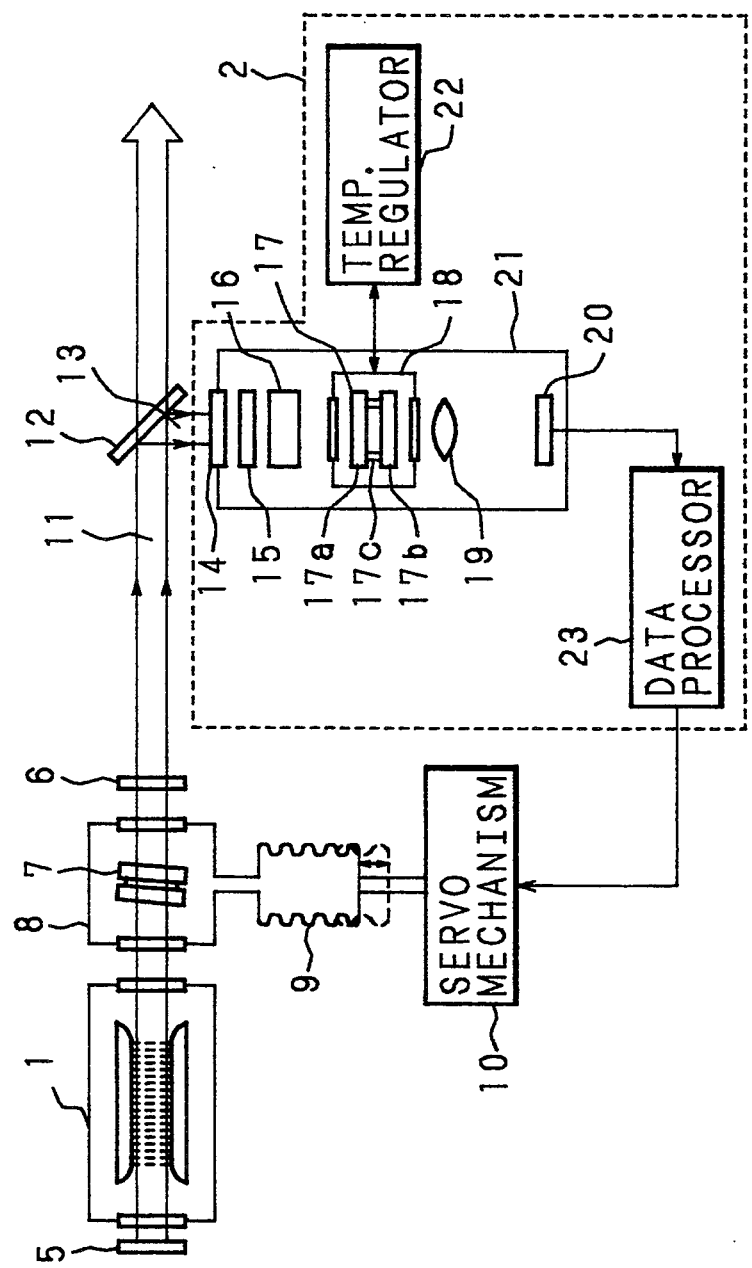
FIG. 1 is a structural diagram of a conventional laser apparatus equipped with a wavelength measuring device.
Figure 2:
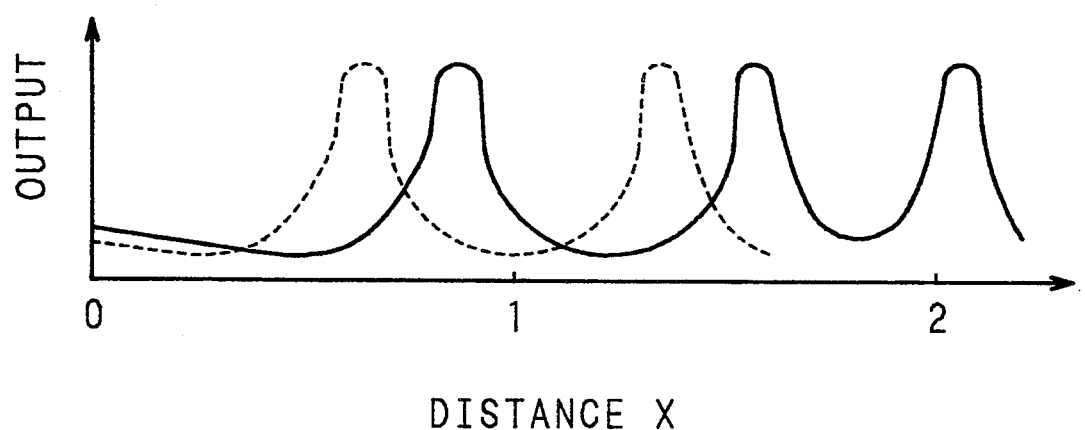
FIG. 2 is a diagram of fringes formed on a photosensor of FIG. 1.

As explained with reference to FIG. 1, when the wavelength measuring device 2 is used in combination with the laser oscillator 1 and the measuring output signal is fed back to control the pressure of the ambience gas in the FP 7, a laser apparatus is capable of maintaining the wavelength of the laser beam constant for a long time.

Embodiment 2

Although the glass of low expansion coefficient forming the FP has a linear expansion coefficient of $0.5 \times 10^{-7}$ or lower coefficient in the foregoing Embodiment 1, if a glass having the linear expansion coefficient of $0.5 \times 10^{-7}$ or lower is used, the allowable temperature change of the FP so as to restrict the measuring error in wavelength of the KrF laser to 0.05 pm is ±4° C. Therefore, since the temperature change in a general clean room is regulated within ±2° C., no particular consideration is needed for the circumstances where the wavelength measuring device or the laser apparatus equipped with the wavelength measuring device is installed.

Embodiment 3

The foregoing Embodiment 1 in which wavelength is corrected in use of the standard light source 24 is discussed on condition that $\Delta d_1$ is turned equal to 0 by forming the spacer 17c of the FP 17 of glass of a low linear expansion coefficient, or by measuring the temperature of the FP by the temperature sensor 26 for correction. The wavelength correcting method similar to the above without the above precondition, may be employed although the correcting amount enlarges and the same effect is achieved.

On the contrary, using a method to detect the temperature of the spacer alone for correction is possible.

As this invention may be embodied in several forms without departing from the spirit, of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof, are therefore intended to be embraced by the claims.

What is claimed is:

1. A laser device comprising:
   means for emitting a to-be-measured light;
   a standard light source for emitting a light of a predetermined wavelength;
   a Fabry-Perot etalon through which the to-be-measured light and standard light pass;
   a photosensor for detecting light passing through the Fabry-Perot etalon;
   first means for correcting an error in the measured wavelength of the to-be-measured light on the basis of a deviation of a fringe formed by a light of the standard light source on the photosensor via the Fabry-Perot etalon from a fringe which should be formed by the light of the standard light source;
   means for detecting a temperature of the Fabry-Perot etalon; and
   second means for correcting an error in the measured wavelength caused by thermal expansion of the Fabry-Perot etalon on the basis of a difference between the detected temperature and a stored reference temperature without thermal expansion of the Fabry-Perot etalon.

2. A wavelength measuring device according to claim 1, wherein a spacer between two mirrors of the Fabry-Perot etalon is made of glass having linear expansion coefficient of $5 \times 10^{-7}$ or lower.

3. A wavelength measuring device according to claim 1, wherein the standard light source is a mercury lamp having wavelength close to that of the to-be-measured light.

4. A laser device comprising:
   a light source for emitting a to-be-measured light;
   a standard light source for emitting a light of predetermined wavelength;
   a Fabry-Perot etalon through which the to-be-measured light and standard light pass;
   photosensor for detecting light passing through the Fabry-Perot etalon;
   a temperature detector for detecting a temperature of the Fabry-Perot etalon;
   a data processor for correcting an error in the measured wavelength of the to-be-measured light on the basis of a deviation of a fringe formed by a light of the standard light source on the photosensor via the Fabry-Perot etalon from a fringe which should be formed by the light of the standard light source, and for correcting an error in the measured wavelength caused by thermal expansion of the Fabry-Perot etalon on the basis of a difference between the detected temperature and a stored reference temperature without thermal expansion of the Fabry-Perot etalon.

5. A wavelength measuring device according to claim 4, wherein a spacer between two mirrors of the Fabry-Perot etalon is made of glass having linear expansion coefficient of $5 \times 10^{-7}$ or lower.

6. A wavelength measuring device according to claim 4, wherein the standard light source is a mercury lamp having wavelength close to that of the to-be-measured light.

* * * * *